United States Patent [19]
Forjohn

[11] Patent Number: 5,743,212
[45] Date of Patent: Apr. 28, 1998

[54] SELF FILLING MODULAR BIRD BATH

[76] Inventor: Anthony W. Forjohn, 4143 Redwood Rd., Lafayette Hill, Pa. 19444

[21] Appl. No.: 766,756

[22] Filed: Dec. 13, 1996

[51] Int. Cl.$^6$ .................................................. A01K 7/04
[52] U.S. Cl. ...................... 119/69.5; 119/72; 119/78
[58] Field of Search ........................ 119/69.5, 72, 74, 119/78, 79, 476; 239/17, 23, 18, 20

[56] References Cited

U.S. PATENT DOCUMENTS

| | | | |
|---|---|---|---|
| 2,241,636 | 5/1941 | Eliason | 119/78 |
| 2,654,346 | 10/1953 | Goff | 119/74 X |
| 2,887,988 | 5/1959 | Cottongim | 119/69.5 X |
| 2,962,332 | 9/1960 | Laster, Sr. | 119/78 |
| 3,306,262 | 2/1967 | Hart | 119/78 |
| 3,696,786 | 10/1972 | Garwood | 119/69.5 |
| 3,874,344 | 4/1975 | Smith | 119/78 |
| 3,995,591 | 12/1976 | Garwood | 119/69.5 |
| 4,509,460 | 4/1985 | Seltzer | 119/74 |
| 4,630,569 | 12/1986 | Dieleman | 119/69.5 |

*Primary Examiner*—Gene Mancene
*Assistant Examiner*—Yvonne R. Abbott

[57] ABSTRACT

A self filling, modular bird bath with an automatic fill valve operated by a float mechanism. The bath consists of single or multiple basin modules (25) attached to a hollow vertical support module (10). The support module contains an automatic fill valve (17) housed in a float chamber (12) which delivers water to the float chamber and thence by gravity flow to the interconnected basin modules. The fill valve is pre-set to maintain the desired water level in the float chamber, and hence, in the basin modules. When the water level in the float chamber is lowered by dissipation of the water in the basin modules via bird bathing activity or evaporation, downward float movement opens the fill valve which supplies the water required to restore the pre-set water level. The support module is engaged and supported by a bracket (15) attached to a ground stake (16). The support module is equipped with a standard garden hose fitting, which delivers pressurized potable water to the float chamber via a garden hose (18).

The potable water system used to supply the modular bird bath is protected from contamination by a vacuum break device in the fill valve. A support module with or without basin modules can be used to convert conventional bird baths to self filling operation.

8 Claims, 2 Drawing Sheets

SELF FILLING MODULAR BIRD BATH

BACKGROUND

1. Field of Invention

This invention relates to self filling bird baths.

2. Description of Prior Art

The benefits conferred by bird baths upon birds and humans are well known. Birds require periodic bathing to clean and groom feathers and skin, to control and eliminate external parasites, and to cool their bodies in hot weather. They also require drinking water. Bird baths provide all of these benefits for the birds.

Humans are able to observe the birds attracted to bird baths, and thereby appreciate the interesting activities and compelling beauty of these remarkable creatures, in the privacy and convenience of their homes.

Observation of birds as they use conventional bird baths—shallow basins dependant upon water hand-carried by humans—demonstrates the need for a constant and automatically renewed water supply. Water in the basin is quickly depleted by even one energetic bather, and it is not practical to repeatedly carry water to refill the basin, nor is it possible to do so without frightening the birds away.

Observation also demonstrates that many birds visit the bath simultaneously and compete for its use. Smaller, or less aggressive birds must wait until larger or more aggressive birds have finished their baths. Many birds are thereby left with nearly empty bird baths and insufficient water for their baths.

Different species display different bathing styles. Robins will often settle down in a basin and quietly rest for some time partly submerged in the water, monopolizing the bath, while more vigorous bathers, like starlings, raise great sprays of water with rapid wingbeats, quickly depleting the water supply. The conventional bird bath, with its limited water supply and single basin, can therefore provide bathing opportunities for only a small number of birds, and then only at each manual filling of the bath.

An example of a self filling bird bath is shown in U.S. Pat. No. 4,630,569, to Dieleman (1986). In this assembly, water is introduced into the basin by a retractable spray nozzle which purports to clean as well as refill the basin at periodic intervals. The spray nozzle is operated by remotely located electric solenoid valves and electric timing controls, which produce sequences of low water flow for filling and greater water flow for agitation and water removal from the bowl. The cleaning and filling operations of this complex and costly assembly interrupt the use of the bath and frighten birds away. In addition, a constant water level cannot be maintained by what must necessarily be arbitrarily timed cleaning and filling cycles, instituted without regard for water depletion effected by the birds' unscheduled bathing activity. Water is wasted by cleaning and fill cycles that occur during domant periods when the bath is not in use. Also, algae growth cannot be removed by the spray nozzle, and periodic manual cleaning of the bath is required, in any case. Further, the purchase and installation of the equipment, and the ongoing maintenance and repair of this complex assembly of mechanical and electrical devices and controls would be costly, and would require periodic service by specially trained personnel.

OBJECTS AND ADVANTAGES

The objects and advantages of the present invention are:

(a) Provision of a constant water supply in the basins by a simple, reliable, inexpensive and easily replaced float-controlled fill valve, greatly increasing the number of birds that can utilize the bath.

(b) Conservation of water by providing only as much water as is required by bathing activity.

(b) Provision of multiple basins accomplished by economical, repetitive modular lightweight plastic components, incorporating the use of one, two, three or four basin modules, attached to a single support module, which supplies water to all basin modules, greatly increasing the number of birds that can simultaneously use the bath.

(c) Use of a convenient and usually existing water source available to all building types—an ordinary garden hose attached to a hose bibb.

(d) Provision of easy installation and flexibility of location, utilizing the garden hose and ground stake support, with installation and relocation easily and quickly accomplished.

(e) Provision of integral cleaning action, where cleaning of the bath is accomplished to a large extent by the bathing activity itself. Much of the debris, such as leaves, feathers and excrement is removed from the bath by the movement and splashing of the birds, when a constant water level is maintained.

(f) Provision for control of algae by the use of a harmless chemical additive such as copper sulfate placed in renewable cartridge form in the float chamber. Removal of algae buildup without copper sulfate control requires manual cleaning of the basin at weekly intervals. This cleaning interval can be extended by the use of copper sulfate.

DRAWING FIGURES

REFERENCE NUMERALS IN DRAWINGS

| | |
|---|---|
| 10 support module | 19 rigid plastic water pipe |
| 11 support module cap | 20 basin module water supply hose |
| 12 float chamber | 21 mesh strainer |
| 13 access chamber | 22 basin module bracket |
| 14 access chamber opening | 22A basin module support disc |
| 15 support module bracket | 23 basin module bracket collar |
| 16 support module stake | 24 basin module hinge |
| 17 automatic fill valve | 25 basin module |
| 18 garden hose | 26 perch |
| 18A short garden hose | 27 conventional bird bath |
| | 28 water level |

DESCRIPTION

Figure 1:
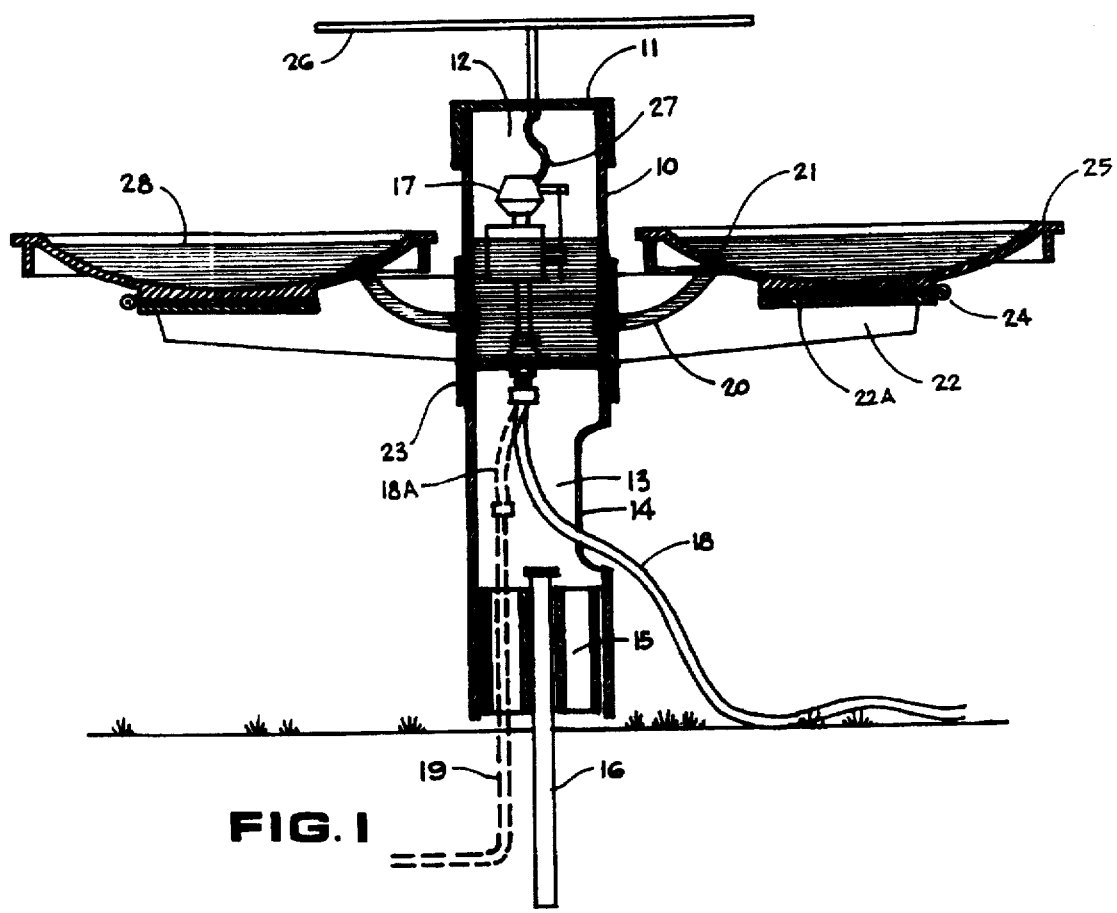
FIG. 1 shows a vertical section through bath with two basin modules and a support module.
Figure 2:
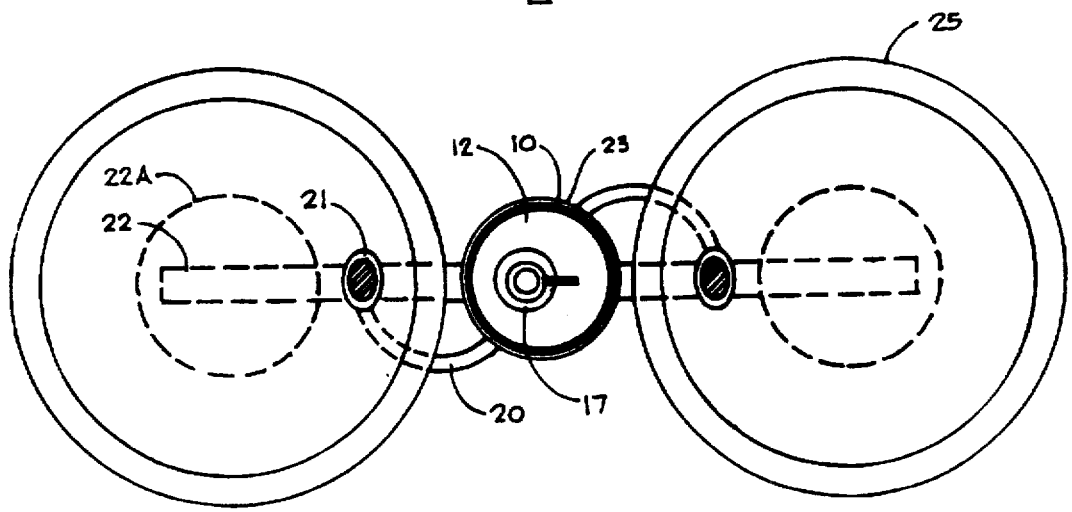
FIG. 2 shows a horizontal section of the two basin bath taken through the float chamber, above basin level.
Figure 3:
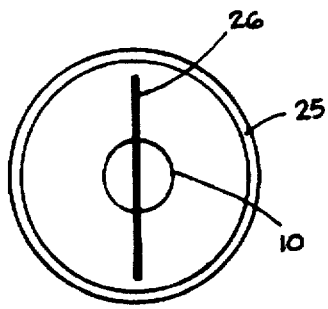
FIG. 3 shows a plan view of a single basin bath.
Figure 4:
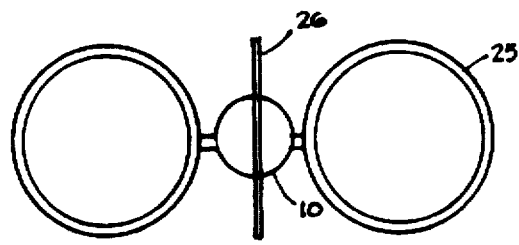
FIG. 4 shows a plan view of a two basin bath.
Figure 5:
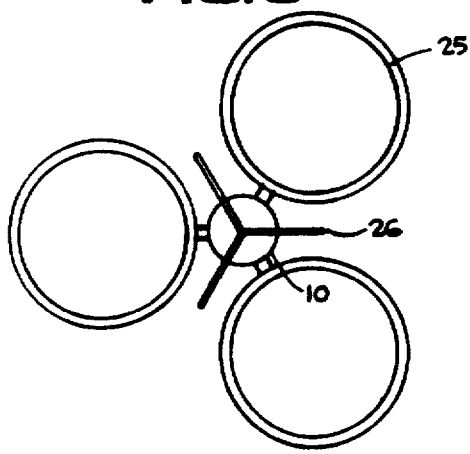
FIG. 5 shows a plan view of a three basin bath.
Figure 6:
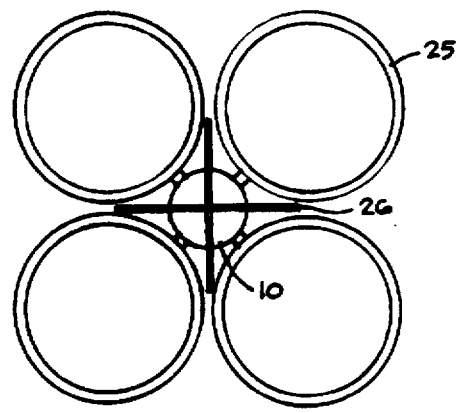
FIG. 6 shows a plan view of a four basin bath.
Figure 7:
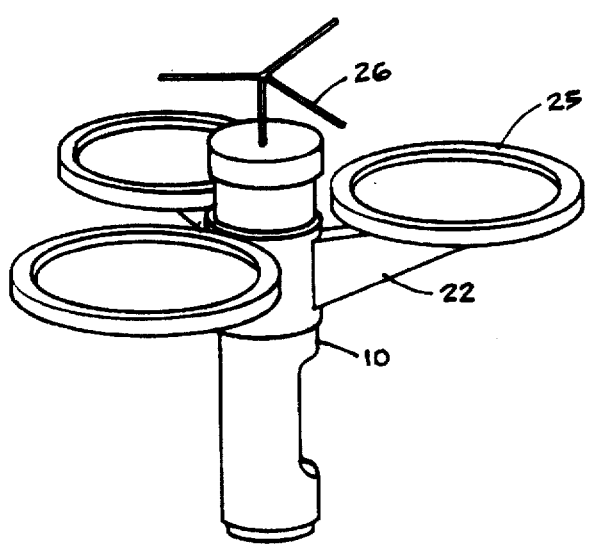
FIG. 7 shows a perspective view of a three basin bath.
Figure 8:
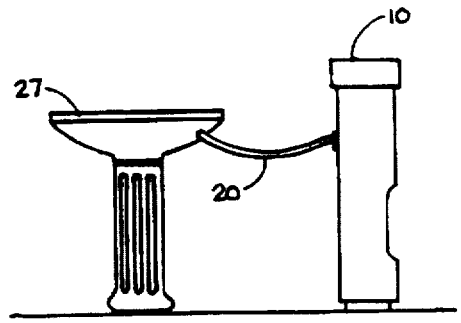
FIG. 8 shows a side elevation of a conventional single basin bath, converted to self filling operation by connection to a support module with a basin module water supply hose.

FIGS. 1 and 2

A typical embodiment of the present invention is shown in FIG. 1 (vertical section of a two basin bath), and FIG. 2

(top view of a two basin bath). The support module 10 is mounted on the support module bracket 15, which in turn is attached to the support module stake 16, which is driven into the ground at the desired location of the bath.

The upper portion of the support module 10 consists of a float chamber 12, which contains the automatic fill valve 17, and a support module cap 11, which is removable to permit access to the float chamber 12 and automatic fill valve 17.

The automatic fill valve illustrated is a popular and inexpensive fill valve for residential two piece tank type toilets, Model 400A as manufactured by Fluidmaster, Inc. of Anaheim, Calif. The valve is constructed of non corroding stainless steel and plastic, and has an anti-siphon vacuum break to prevent contamination of the potable water supply connected to the fill valve. The valve is activated by a drop in water level in the float chamber of ⅛ inch to ¼ inch. The threaded pipe base of the automatic fill valve 17 extends through the floor of the float chamber 12, and is held by a nut and gasket against the underside of the float chamber floor to support the fill valve and seal the float chamber against water leaks. Attached to the threaded pipe base of the fill valve 17 is a female garden hose fitting, which receives the male fitting at the end of the garden hose 18. An alternate concealed and more permanent water supply is shown in the buried PVC pipe 19, which is provided with a male hose fitting at its end to receive the female fitting of a short garden hose 18A. The lower portion of the support module 10 consists of an access chamber 13, with an access chamber opening 14 which permits water supply attachments 18 and 18A fill valve 17.

The basin modules 25 are supported by basin module brackets 22 which are attached to the basin module bracket collar 23, which is, in turn, attached to the support module 10. The ends of the basin module brackets 22 have round support discs 22A which align with and support the basin modules 25. The basin modules 25 and the basin module support discs 22A are joined by hinges 24, which permit tilting of basin modules to empty basin contents.

The basin modules 25 are connected to the float chamber 12 by basin module water supply hoses 20. Water from the float chamber 12 fills basin modules 25 to the level of water maintained by the fill valve 17 in the float chamber 12. The basin module water supply hoses 20 have mesh strainers 21 at the connections to the basin modules 25 which prevent debris from entering the hoses and float chamber. The basin water supply hoses are flexible and friction fit on male hose fittings at points of connection to the basin modules 25 and the float chamber 12. Openings are provided in the basin module bracket collar 23 and the support module 10 to accept male hose fittings for basin module configurations for 1, 2, 3, and 4 basin baths.

The support module cap 11 is fitted with various perch 26 arrangements for 1, 2, 3 or 4 basin baths. Where possible, the perches are configured to locate between basin modules to prevent excrement from perching birds from dropping into the basins.

OPERATION

FIG. 1

Water delivered to the fill valve 17 via garden hose 18 or 18A will fill the float chamber 12 to the level set by the adustable fill valve float. By gravity flow, water fills the basin modules via the basin module water supply hoses 20 to the level of water maintained in the float chamber by the fill valve. As water in the basin modules is depleted by bathing activity or evaporation, the movement of the float will open the fill valve and restore the water in the float chamber and the basin modules to the level set by the float, constantly maintaining the same water level in the float chamber 12 and the basin modules 25. Full basins are thereby constantly maintained for bathing. The high water level maintained in the basin modules, in conjunction with the bathing activities of the birds-particularly the agitation, spraying and spilling of basin water by vigorous bathers such as the starlings-will tend to remove debris from the basins that would otherwise accumulate in basins with low and stagnant water levels. A cartridge of copper sulfate hung below water level in the float chamber will infuse copper ions into the water in the basin modules and discourage algae growth, without harm to the birds. Periodic cleaning of the basin modules by humans would remove debris and algae that might collect in the basins over many days of use. Winterizing the bath is accomplished by disconnecting the garden hose water supply, emptying the float chamber, and disconnecting basin module water supply hoses from the basin modules.

The fill valve contains a water supply fitting 27 which provides a shower of water to the basin modules via hollow perch assemblies, or spray fittings in the upper part of the float chamber. The shower would operate while the fill valve is open, and cease when required water level in the float chamber is reached and the fill valve closes.

I claim:

1. A self filling modular bird bath comprising:

(a) a support module containing an automatic fill valve in a float chamber with means for connecting said fill valve to a pressurized water source, (b) single or multiple basin modules attached to said support module by a basin module support collar and basin module brackets, (c) means for connecting said float chamber to said basin modules causing gravity flow of water from said float chamber to said basin modules, whereby said self filling modular bird bath will maintain constant and identical water levels in the basin modules and the float chamber, (d) a support module bracket for fixing said support module to the ground by attachment of said bracket to a support module stake.

2. The automatic fill valve of claim 1 wherein said fill valve is a toilet tank fill valve.

3. The automatic fill valve of claim 1 wherein said fill valve is connected to perches, which are hollow to conduct water and deliver water spray to basin modules during operation of said automatic fill valve.

4. The basin module support collar of claim 1 wherein said support collar is universal, and has fastener holes for attachment of basin support brackets for a plurality of basin modules.

5. The basin module support collar of claim 4, wherein said support collar is universal and has openings for basin module water supply hoses for a plurality of basin modules.

6. The support module of claim 1 wherein said support module is universal, and has openings fitted with removable plugs for basin module water supply hoses for a plurality of basin modules.

7. The basin modules and basin module brackets of claim 1, wherein said basin modules and said basin module brackets are joined by a hinge, to permit manual dumping of basin module contents for cleaning purposes.

8. The support module of claim 1 wherein a conventional bird bath is converted to self filling operation by attachment to said support module with a basin module water supply hose.

\* \* \* \* \*